United States Patent
Jiang et al.

(10) Patent No.: US 11,930,528 B2
(45) Date of Patent: Mar. 12, 2024

(54) UPLINK NULL DATA PACKET FORMAT FOR PASSIVE LOCATION

(71) Applicant: Intel Corporation, Santa Clara, CA (US)

(72) Inventors: Feng Jiang, Santa Clara, CA (US); Dibakar Das, Hillsboro, OR (US); Xiaogang Chen, Portland, OR (US); Chittabrata Ghosh, Fremont, CA (US); Qinghua Li, San Ramon, CA (US); Jonathan Segev, Sunnyvale, CA (US); Robert Stacey, Portland, OR (US); Ganesh Venkatesan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/673,238

(22) Filed: Feb. 16, 2022

(65) Prior Publication Data

US 2022/0174729 A1    Jun. 2, 2022

Related U.S. Application Data

(63) Continuation of application No. 17/124,803, filed on Dec. 17, 2020, now Pat. No. 11,540,317, which is a continuation of application No. 16/287,586, filed on Feb. 27, 2019, now abandoned.

(60) Provisional application No. 62/645,314, filed on Mar. 20, 2018, provisional application No. 62/635,694, filed on Feb. 27, 2018.

(51) Int. Cl.
*H04W 24/10* (2009.01)
*G01S 5/00* (2006.01)
*G01S 5/02* (2010.01)
*H04W 40/12* (2009.01)
*H04W 64/00* (2009.01)
*H04W 74/06* (2009.01)

(52) U.S. Cl.
CPC .............. *H04W 74/06* (2013.01); *G01S 5/00* (2013.01); *G01S 5/0205* (2013.01); *H04W 24/10* (2013.01); *H04W 40/12* (2013.01); *H04W 64/00* (2013.01)

(58) Field of Classification Search
CPC ........ G01S 5/00; G01S 5/0205; G01S 5/0226; G01S 5/10; H04W 24/10; H04W 40/12; H04W 64/00; H04W 74/06
See application file for complete search history.

(56) References Cited

U.S. PATENT DOCUMENTS

2017/0251449 A1* 8/2017 Malik ............... H04W 56/0065

* cited by examiner

*Primary Examiner* — Melvin C Marcelo
*Assistant Examiner* — Natali Pascual Peguero
(74) *Attorney, Agent, or Firm* — Eversheds Sutherland (US) LLP

(57) ABSTRACT

This disclosure describes systems, methods, and devices related to uplink (UL) null data packet (NDP) format for passive location. A device may cause to send a trigger frame that solicits poll response to one or more anchor stations involved in a passive ranging measurement. The device may identify one or more polling response frames received from the one or more anchor stations. The device may cause to send a trigger frame that solicits uplink null data packet (NDP) to the one or more anchor stations, wherein the uplink NDP comprises an indication of a high efficiency (HE) single user (SU) frame type. The device may identify one or more uplink NDPs received from the one or more anchor stations.

20 Claims, 17 Drawing Sheets

| Location trigger subtype | DL SAC | Change Schedule | Reserved |
|---|---|---|---|
| 4 | TBD* | 1 | 3 |

Bits:

UPLINK NULL DATA PACKET FORMAT FOR PASSIVE LOCATION

CROSS-REFERENCE TO RELATED APPLICATION(S)

This application is a continuation of U.S. application Ser. No. 17/124,803, filed Dec. 17, 2020, which is a continuation of U.S. application Ser. No. 16/287,586, filed Feb. 27, 2019, which claims the benefit of U.S. Provisional Application No. 62/645,314, filed Mar. 20, 2018, and U.S. Provisional Application No. 62/635,694, filed Feb. 27, 2018, all of which are incorporated herein by reference as if set forth in full.

TECHNICAL FIELD

This disclosure generally relates to systems, methods, and devices for wireless communications and, more particularly, uplink (UL) null data packet (NDP) format for passive location.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 3A-3G depict illustrative schematic diagrams for availability window, in accordance with one or more example embodiments of the present disclosure.

DETAILED DESCRIPTION

Figure 1:
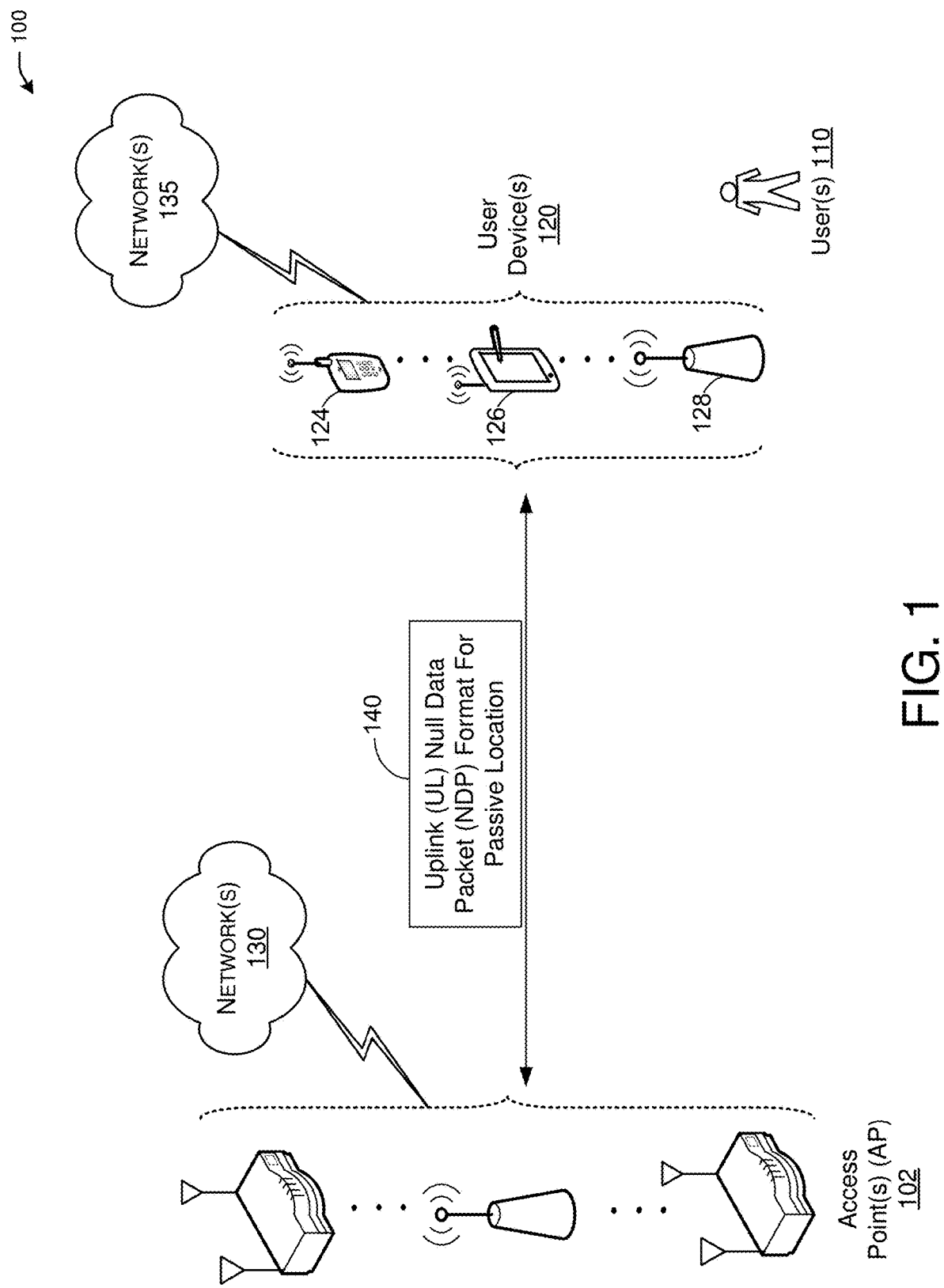
FIG. 1 depicts a diagram illustrating an example network environment of illustrative uplink (UL) null data packet (NDP) format for passive location system, in accordance with one or more example embodiments of the present disclosure.

Example embodiments described herein provide certain systems, methods, and devices, for signaling schedule for location measurement feedback report in wireless local area network (WLAN).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In the development of 802.11az, a passive location mode may be designed that could potentially support unlimited number of passive clients to implement positioning simultaneously. The 802.11az task group (TGaz) agreed to design the measurement part based on the high efficiency (HE) multi-user (MU) measurement sequence. In the HE MU measurement sequence (trigger-based ranging protocol), the master access point (AP) sends trigger frame to solicit the uplink (UL) null data packet (NDP) from the anchor station, and the UL NDP has trigger-based physical layer (PHY) protocol data unit (PPDU) format. In the passive location, the passive client needs to listen to the NDP frame exchanges between the master AP and the anchor station. In general, the passive client is non-AP station, and in general, the non-AP station cannot decode the trigger-based PPDU.

The 802.11az specification mentions the use of availability windows to schedule a group of HEz stations (e.g., stations that support 802.11ax) for multi user ranging. The basic idea is the creation and advertisement of a series of periodic scheduled availability windows within which a group of iSTAs (initiating STAs) will perform with the rSTA (responding STA) ranging related activities (e.g., polling, measurement via uplink (UL) and downlink (DL) sounding, and communication of measurement results). The specification also specifies the sequence of UL and DL sounding frame exchanges that ought to occur between the rSTA and multiple HEz STAs for measurement phase. While the specification mentions that the availability windows are scheduled, it does not describe how those schedules are created, advertised and subsequently modified to suit the changes in the operating conditions of participating rSTA and iSTAs over time. In particular modifications are needed under the scenarios described below:

(1) The rSTA's ability to accommodate schedules preferred by iSTAs that intend to perform HEz ranging with the rSTA decreases with the increase in the number of iSTAs. An rSTA may advertise a new availability window schedule as a result.

(2) An iSTA already participating in HEz ranging with an rSTA may want to change its frequency of HEz ranging (e.g., when the iSTA starts moving and therefore need to perform range estimates more often) or may have additional scheduling constraints (a new time sensitive or latency bound data connection that renders the current ranging availability window unusable). Here, the iSTA may request the rSTA for a modification to the negotiated availability window to fit its current operating conditions.

Some options may exist for frame exchanges during negotiations in HEz ranging so that an rSTA can advertise its availability window schedules to other iSTAs. The solution is not dynamic as (a) the assignment of an iSTA to an availability window happens only during negotiation and (b)

no mechanism is provided for an rSTA to indicate its flexibility to accept an availability window schedule from an iSTA outside the advertised ones.

Example embodiments of the present disclosure relate to systems, methods, and devices for UL NDP format for passive location.

In one embodiment, a UL NDP format for passive location system may address the uplink sounding NDP format for passive location and may minimize the hardware change at the passive client side.

In one embodiment, a UL NDP format for passive location system may use the HE single user (SU) NDP format for the UL NDP in passive location, such that the passive client can decode the SU NDP without hardware change.

In one or more embodiments, the passive client may listen for the UL NDP from each of the anchor stations and the DL NDP from the master AP. In general, only the AP can decode a trigger-based PPDU. Typically, a passive client is a non-AP STA and thus cannot decode a trigger-based PPDU, but it's a mandatory requirement of 802.11 spec for the non-AP STA to decode the SU PPDU. In other words, only AP can decode the trigger based (TB) PPDU. Since the passive client is in general a non-AP STA, for example, mobile phone or laptop, the passive client cannot decode TB PPDU. For example, after receiving the trigger frame, the anchor STA will response with HE SU PPDU NDP, such that the passive client can receive and decode the SU NDP.

The format of the trigger-based PPDU is different from the SU PPDU. For example, the HE-SIG-A1 field included in a trigger-based PPDU and an SU PPDU may contain information that would differentiate a trigger-based PPDU from an SU PPDU. Also, the length of the HE-STF field of the trigger-based PPDU and SU PPDU are different.

In one more embodiments, a passive client would need to decode the UL NDP(s) and the DL NDP frames in order to derive timing information from these frames. The timing information may then assist the passive client device to determine its own location. However, if during location ranging measurement the master AP and the anchor stations, the anchor stations send their UL NDPs using a trigger-based PPDU, the passive client would not be able to decode these UL NDPs in order to retrieve or otherwise identify timing information included in each of the UL NDPs because the passive client may not have the capability to decode trigger-based PPDU.

In one or more embodiments, the anchor stations may respond using an HE SU PPDU format of their UL NDP sent in response to a trigger frame soliciting UL NDP received from the master AP. In essence, the passive client would hear or otherwise detect the UL NDPs from the anchor stations and may decode the UL NDPs because of the indication of the PPDU frame type being HE SU PPDU and not trigger-based.

In one embodiment, a system may address the problem of how an rSTA and iSTA in MU-Hez operations can perform flexible scheduling by accounting for such dynamic changes to respective scheduling constraints.

In one embodiment, a system may facilitate that the rSTA can indicate whether their advertised availability window schedule is flexible or not to the iSTAs; the iSTA can request the rSTA with a schedule that is not advertised only informer case.

In one embodiment, the rSTA can amend the advertised availability window schedule and indicate that to the iSTA (s) during HEz protocol execution within an availability window.

In one embodiment, the iSTA can send new schedule change requests to the rSTA during HEz protocol execution within an availability window.

In one embodiment, the system may make it more flexible with minimal additional overhead. The enhancement occurs because the availability window schedules created by the rSTA can now more closely reflect the needs of an iSTA without sacrificing any rSTA centric design.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment, in accordance with one or more example embodiments of the present disclosure. Wireless network 100 may include one or more user devices 120 and one or more access point(s) (AP) 102, which may communicate in accordance with IEEE 802.11 communication standards. The user device(s) 120 may be mobile devices that are non-stationary (e.g., not having fixed locations) or may be stationary devices.

Figure 5:
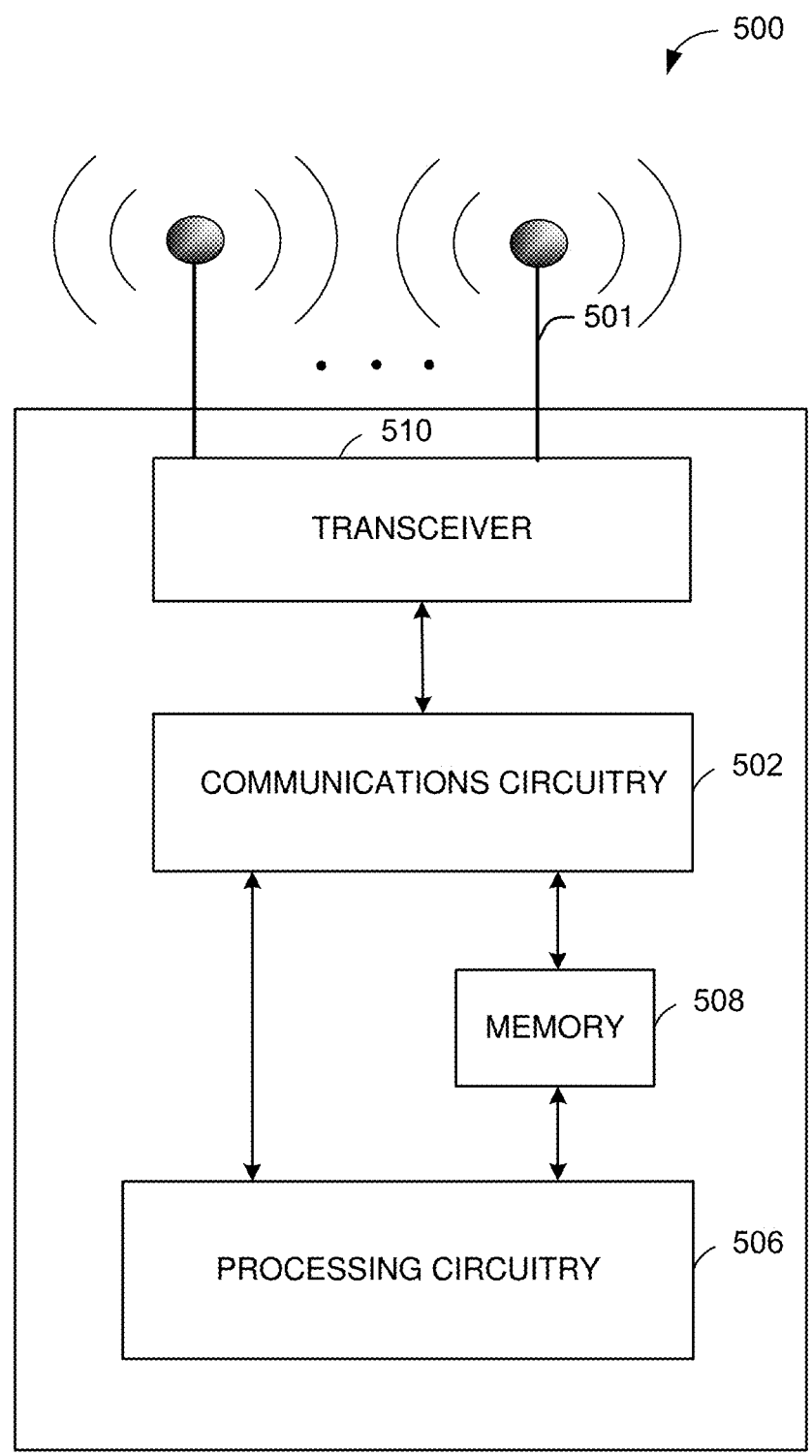
FIG. 5 depicts a functional diagram of an example communication station, in accordance with one or more example embodiments of the present disclosure.
Figure 6:
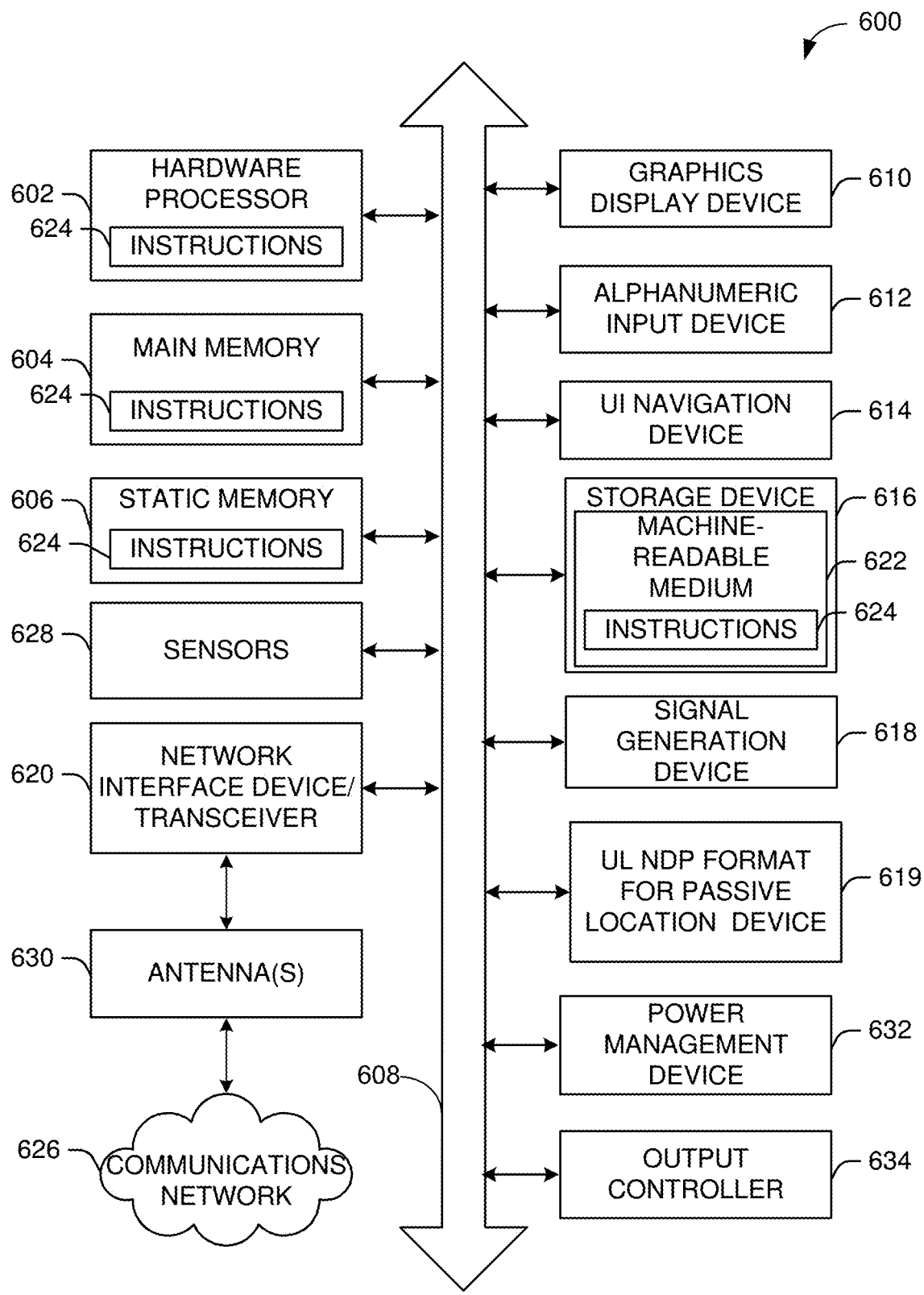
FIG. 6 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

Some embodiments may be used in conjunction with devices and/or networks operating in accordance with existing. Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, AP 102 and/or a user device 120 may determine a UL NDP format for passive location 140. It is understood that the above descriptions are for purposes of illustration and are not meant to be limiting.

Figure 2A:
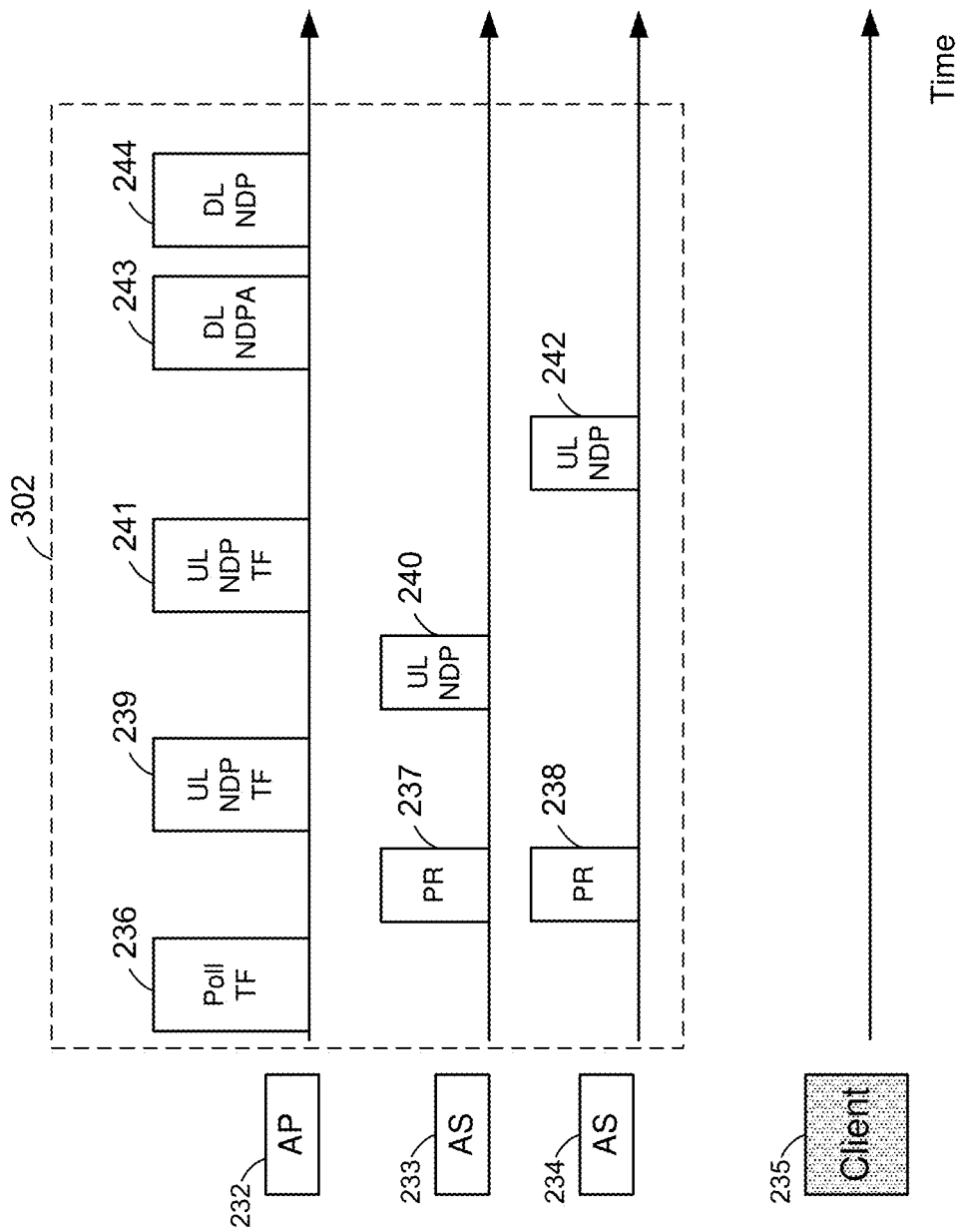
FIGS. 2A-2B depict illustrative schematic diagrams for UL NDP format for passive location, in accordance with one or more example embodiments of the present disclosure.
Figure 2B:
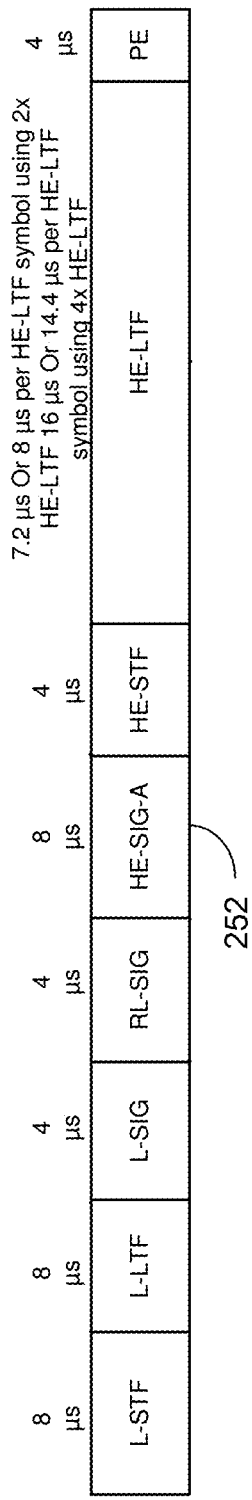

FIGS. 2A-2B depict illustrative schematic diagrams for UL NDP format for passive location, in accordance with one or more example embodiments of the present disclosure.

In one embodiment, in the passive location mode, the measurement sequence shown in FIG. 2A may be used for the frame exchanges between the master AP 232 and anchor stations (ASs) 233 and 234. It should be noted that there could be more than two anchor stations in the system. Further, there is shown in FIG. 2A a client device 235 (referred to herein as client 235) that acts as a passive client device capable of capturing and decoding some of the frames exchanged between the master AP 232, the AS 233, and the AS 234.

In one embodiment, the master AP 232 may send a poll trigger frame 236 to poll the anchor stations 233 and 234. The anchor stations 233 and 234 may respond each with a poll response (PR) frame (e.g., PR frame 237 and PR frame 238). The master AP 232 may then send an uplink NDP soliciting trigger frame (UL NDP TF 241) to the anchor stations 233 and 234. After a short inter-frame space (SIFS) of receiving the UL NDP TF 239, the anchor stations 233 and/or 234 may transmit a UL NDP (e.g., UL NDP 240 from AS 233 and UL NDP 242 from AS 234), and all the passive clients (e.g., client 235) need to listen to this UL NDP (e.g., UL NDP 240 from AS 233 and UL NDP 242 from AS 234) and based on the UL NDP, determine timing information associated with the UL NDP, for example, the client 235 may estimate the time of arrival of the respective UL NDP. Each UL NDP TF (e.g., UL NDP TF 239 may trigger AS 233 and UL NDP TF 241 may trigger AS 234) may only trigger one anchor station, and rather than using a trigger-based PPDU format for the UL NDP (e.g., UL NDP 240 and UL NDP 242), a high efficiency (HE) sounding NDP PPDU format in 802.11ax may be used for the UL NDP as shown in FIG. 2B.

Referring to FIG. 2B, there is shown a high-efficiency (HE) Sounding NDP PPDU format. The HE Sounding NDP PPDU comprises one or more fields such as, legacy short training field (L-STF), a legacy long training field (L-LTF), a legacy signal field (L-SIG), a repeat L-SIG, a HE-SIG-A field 252, a HE-STF, a HE-LTF, and a packet extension (PE) field. The HE Sounding NDP PPDU may be used by the anchor stations (e.g., AS 233 and AS 234) when sending their UL NDP to the master AP 232. The passive client 235 may receive the HE Sounding NDP PPDU (e.g., UL NDP 240 and UL NDP 242) without hardware change. Receiving the sounding NDP PPDU includes the capability to identify the frame and the ability to decode it. For example, the passive client 235 may receive the UL NDP 240 and decode the one or more fields included in the UL NDP 240. Since the UL NDP 240 follows the HE Sounding NDP PPDU format, it contains a HE-SIG-A field 252 that may comprise an indication of the type of the PPDU. Further, the HE-SIG-A field 252 of the UL NDP 240 may be set based on the UL NDP TF 239 received from the master AP 232. For example, the HE-SIG-A field 252 may be copied in the common info field of UL NDP TF 239.

It is understood that the above descriptions are for purposes of illustration and are not meant to be limiting.

Figure 3A:
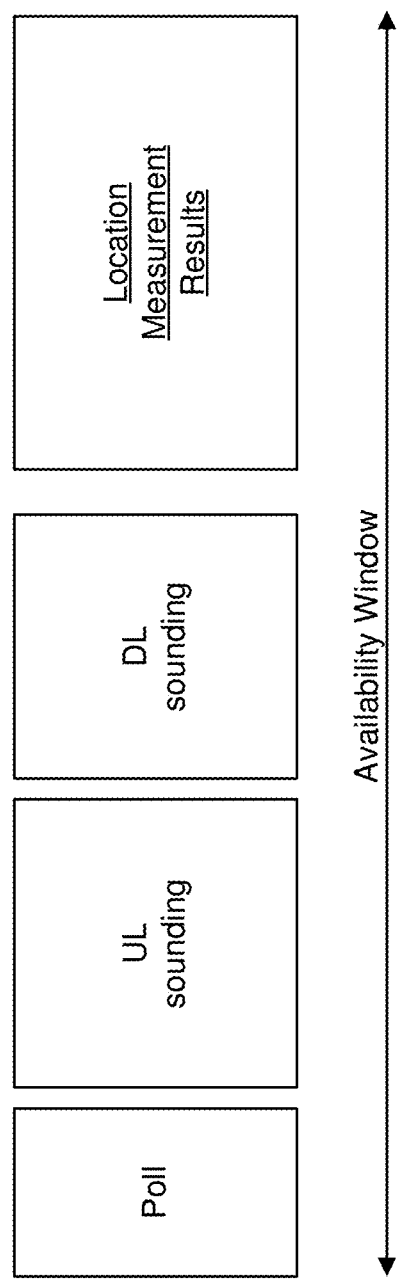
Figure 3B:
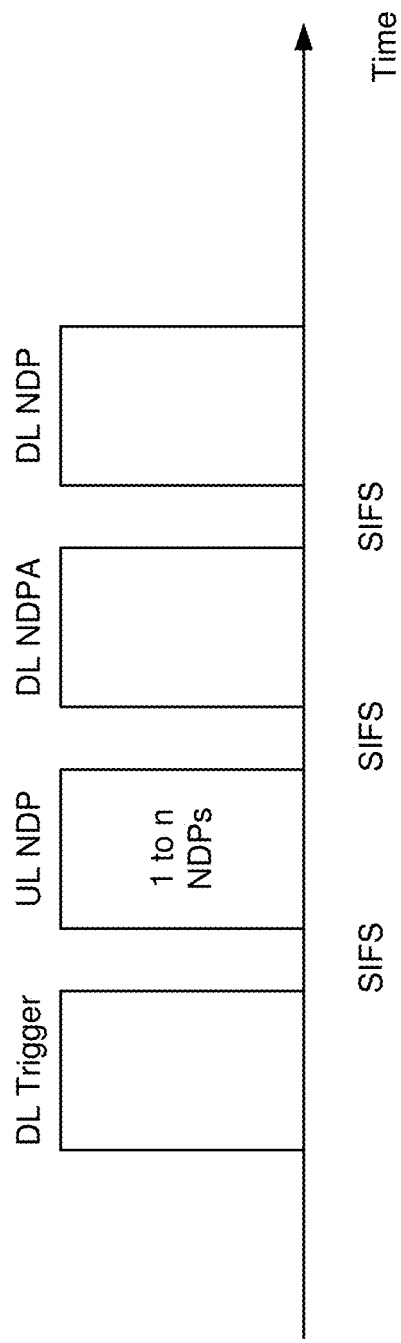

FIGS. 3A-3B depict illustrative schematic diagrams for availability window, in accordance with one or more example embodiments of the present disclosure.

Referring to FIG. 2A, there is shown an availability window 302 consisting of a single round of poll, measurement (i.e., UL and DL sounding) and communication of measurement results.

The 802.11az specification mentions the use of availability windows to schedule a group of HEz stations (i.e., stations that support 802.11ax) for multi user ranging. The basic idea is the creation and advertisement of a series of periodic scheduled availability windows within which a group of iSTAs will perform with the rSTA ranging related activities (i.e., polling, measurement via UL and DL sounding, and communication of measurement results as shown in FIG. 2A).

The 802.11az also specifies the sequence of UL and DL sounding frame exchanges that ought to occur between the rSTA and multiple HEz STAs for measurement phase as shown in FIG. 2B.

FIGS. 3C-3G depict illustrative schematic diagrams for a dynamic availability window, in accordance with one or more example embodiments of the present disclosure.

In one embodiment, an rSTA may announce whether it can accept a proposed availability window from iSTA(s) outside the advertised ones. Note that the flexibility can change dynamically. For example, when there are many iSTAs with which the rSTA is operating, the rSTA's availability window is likely to be inflexible. However if the number of iSTAs decrease the rSTA's availability window may become flexible.

In one embodiment, an rSTA can advertise an amended schedule for subsequent operation within the current availability window.

In one embodiment, an iSTA may request to amend the current availability window schedule to the rSTA in the availability window.

In one embodiment, an rSTA may announce its flexibility to currently advertised schedules in beacons and probe responses. If the availability window schedule is flexible, this means the rSTA may accept a proposed schedule that is not in the list of the availability windows advertised by the rSTA, from an iSTA. An example of how an iSTA can use this information to negotiate a schedule with the rSTA is shown in FIG. 3C.

Figure 3C:
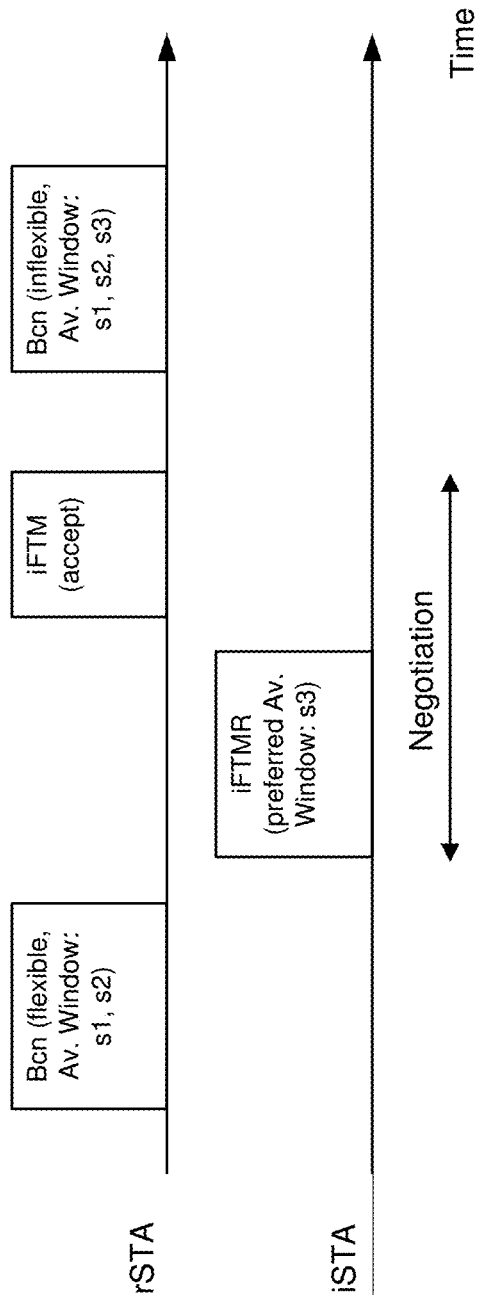

FIG. 3C shows an example of how an iSTA can request an rSTA for a schedule (s3) that is outside of current advertised ones (s1, s2) if the rSTA indicates inside a beacon that its availability window schedules are flexible.

In one embodiment, if the rSTA announces its availability windows to be inflexible, then an iSTA shall not request the rSTA, a preferred availability window schedule outside the one that is advertised.

In one embodiment, the decision about when and how the rSTA determines that its advertised availability window schedule is flexible is implementation-specific. Whether the schedules are flexible or not can be indicated by using a bit in the HEz Specific Parameters subelement if it is sent inside beacon or probe response frames. Whether the schedules are flexible or not can be indicated by using a reserved bit in the Capability Information field inside a Beacon or Probe Response frame. For example, for a non-DMG rSTA the bit B6 of the Capability Information can be reused by setting it to 1 to indicate flexible schedule and to 0 otherwise.

Figure 3D:
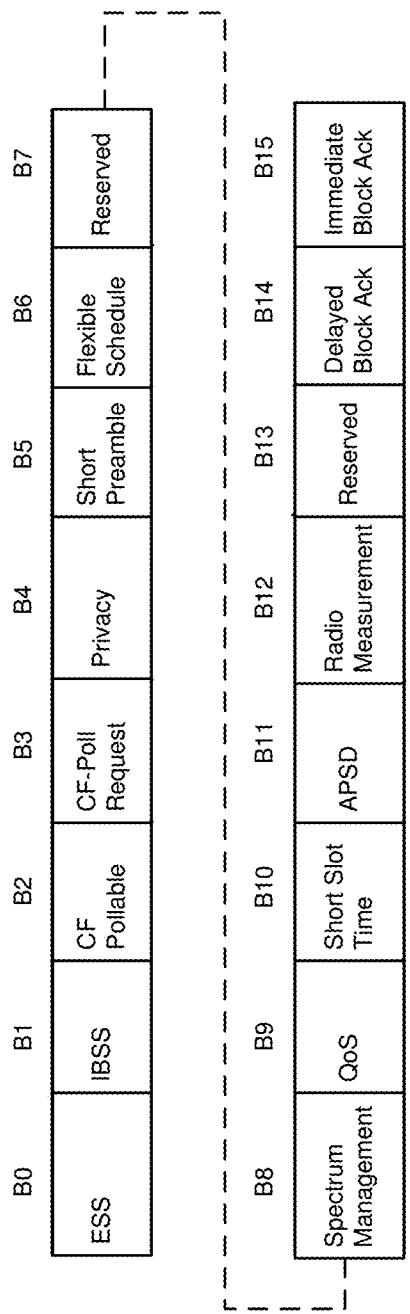

Referring to FIG. 3D there is shown a modified Capability Information field of a non-DMG rSTA.

In one embodiment, a rSTA indicates an amended availability window schedule in one or more of the DL NDP Trigger frames and/or in subsequent polling trigger frames in the same availability window.

In one embodiment, a rSTA can receive a request from an iSTA to change its existing schedule as a response to a sent trigger frame.

Figure 3E:
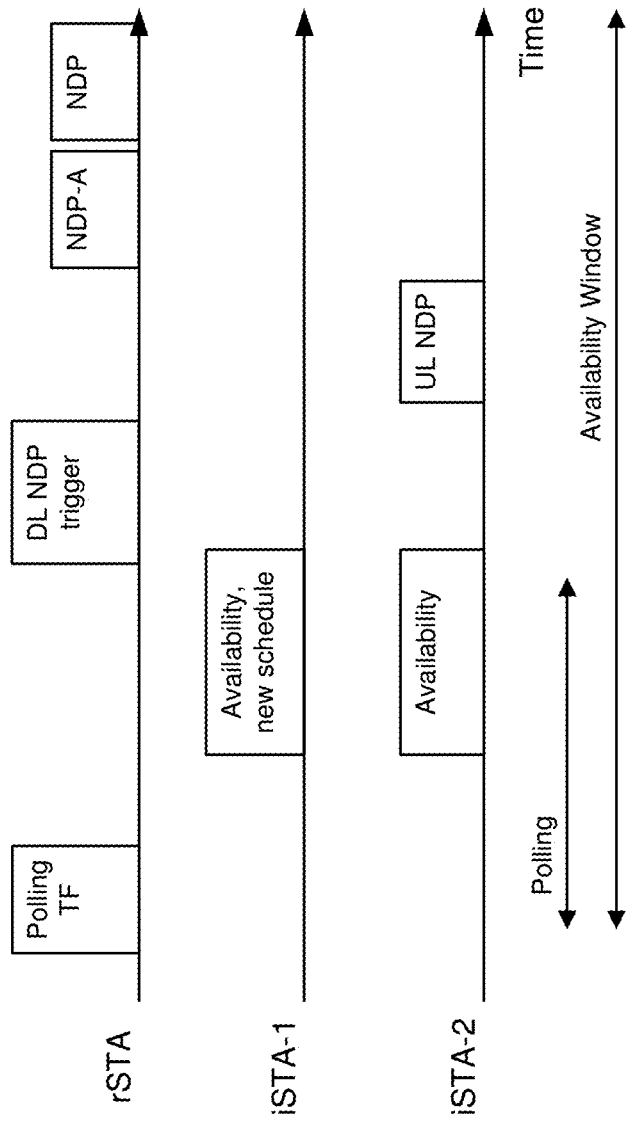

In one embodiment, the trigger frame may be sent to the iSTA in an availability window during polling as shown in FIG. 3E.

FIG. 3E shows an example of an iSTA (iSTA-1) requesting a new availability window by indicating the same inside the response to the polling Trigger frame. On receipt of this request, rSTA indicates the new schedule for iSTA-1 inside the DL NDP trigger frame.

In order to reduce overhead, an rSTA may only allow an iSTA to request a new schedule occasionally. This can be indicated by using one of the 4 reserved bits in the Trigger Dependent Common Info subfield for the Location variant inside the sent polling trigger frame as shown in FIG. 3F; the polled iSTAs can indicate their willingness to change schedule in the corresponding response only when this bit is set to 1.

FIG. 3F shows an example of a modified Trigger Dependent Common Info subfield for the Location variant with a newly defined bit (Change Schedule) to indicate the rSTA can receive requests to change current availability window.

In one embodiment, the iSTA may indicate a preferred availability window schedule other than one that is advertised by the rSTA if the rSTA has indicated its flexibility to accommodate new schedule.

In one embodiment, in order to reduce overhead, in the response to the trigger frame an iSTA may only indicate its intention to change its availability window schedule without actually indicating the exact preferred availability window schedule. The rSTA and iSTA may carry out additional frame exchange outside the current availability window to complete migration of the iSTA to a new availability window.

Figure 3G:
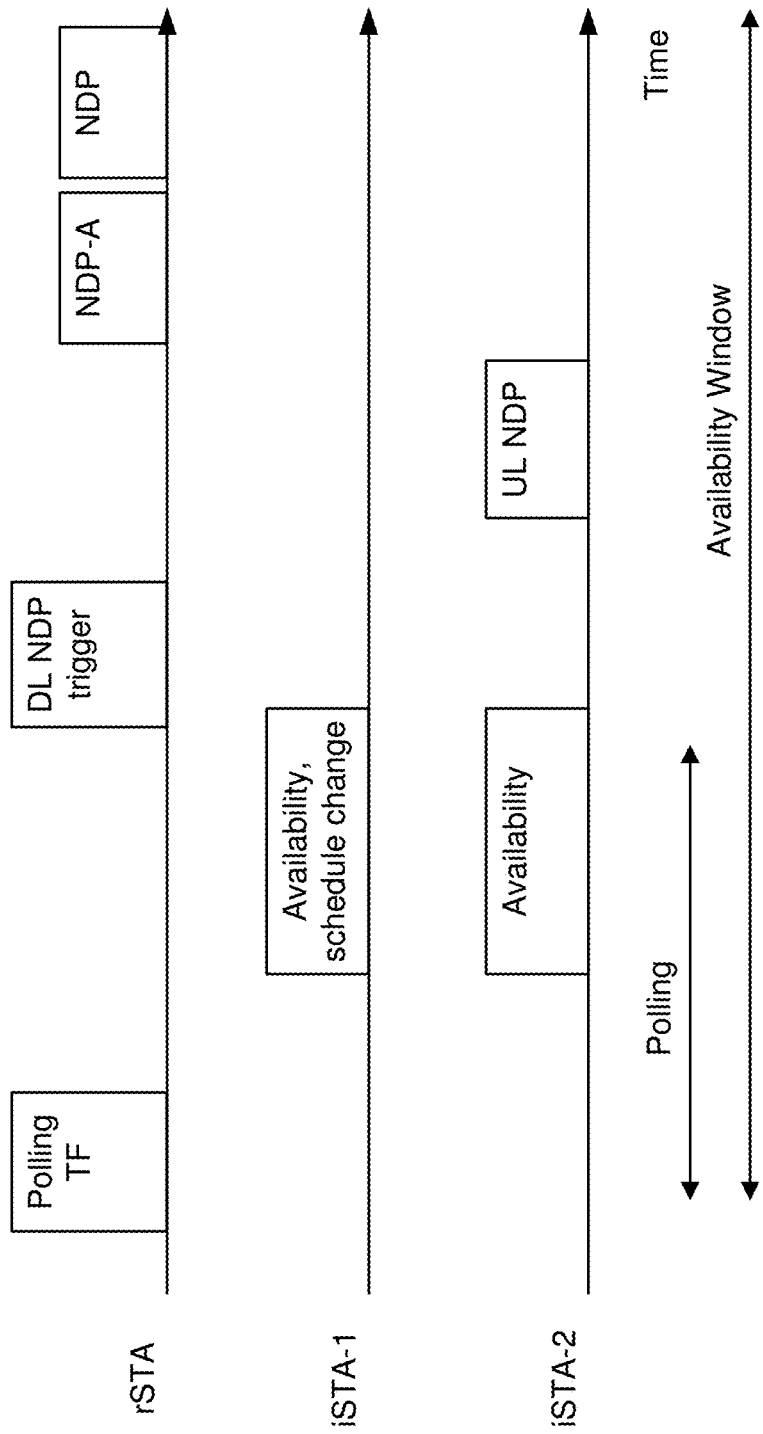

Referring to FIG. 3G, there is shown an example of how an iSTA may only indicate a schedule change request to the rSTA during polling while the actual requested schedule may be conveyed to the rSTA in a separate frame exchange.

FIG. 3G shows an example of an iSTA (iSTA-1) requesting a new availability window by indicating the same inside the response to the polling Trigger frame. On receipt of this request, rSTA knows that iSTA-1 wants to change schedule; iSTA-1 may covey the actual requested schedule to rSTA outside the availability window (for example, as response to some Trigger frame from rSTA similar to the MU-ranging negotiation process in the 802.11az specification).

Note that all schedule amendments if accepted by the rSTA will be effective from the subsequent HEz ranging protocol execution window. If the rSTA does not accept the change proposed by the iSTA or if the iSTA cannot operate with the new schedule advertised by the rSTA, the iSTA either has to abort the session or change its operating conditions to match the availability window schedule.

Figure 4:
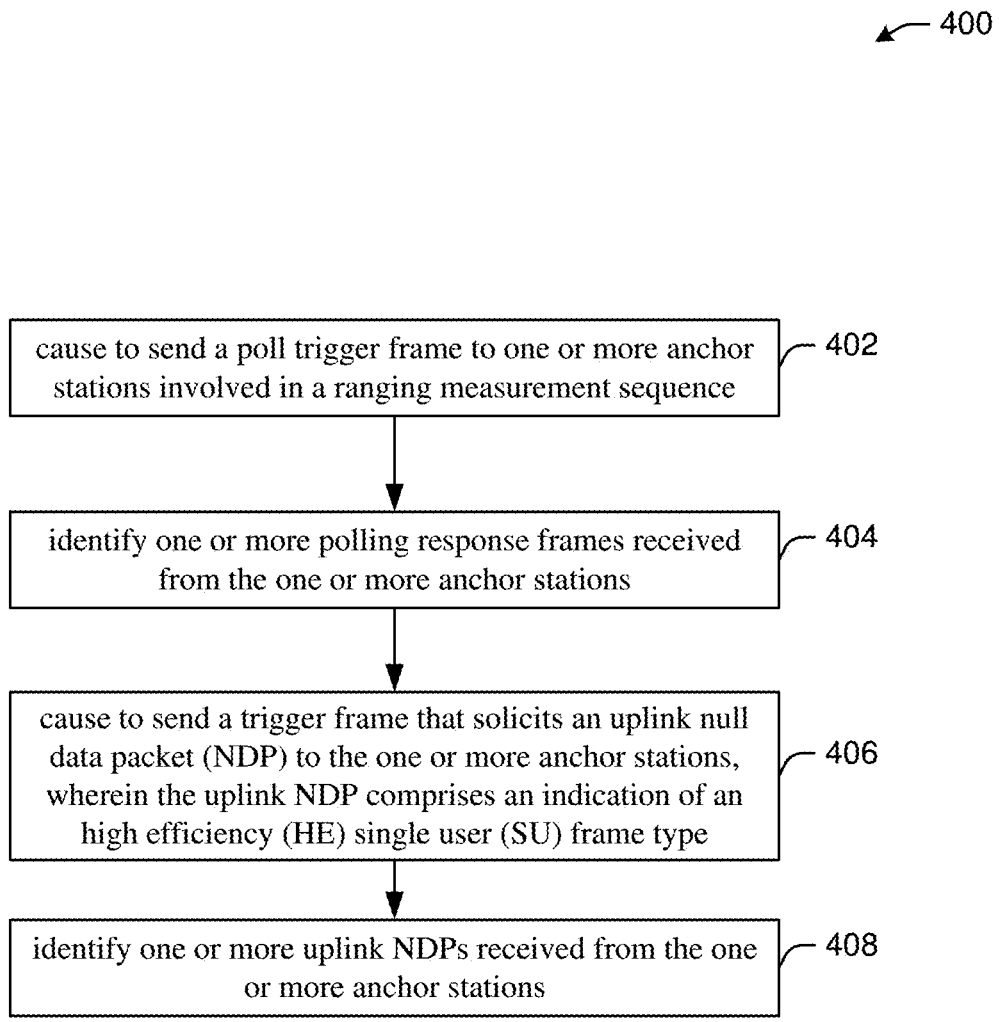
FIG. 4 depicts a flow diagram of illustrative process for a UL NDP format for passive location system, in accordance with one or more embodiments of the disclosure.

FIG. 4 illustrates a flow diagram of illustrative process 400 for an illustrative UL NDP format for passive location system, in accordance with one or more example embodiments of the present disclosure.

At block 402, a device (e.g., the user device(s) 120 and/or the AP 102 of FIG. 1) may cause to send a trigger frame that solicits poll response to one or more anchor stations involved in a passive ranging measurement. The trigger frame that solicits uplink null data packet (NDP) may trigger a first anchor station of the one or more anchor stations to send uplink NDP. The one or more uplink NDPs may be high-efficiency sounding NDP physical layer convergence protocol data units (PPDUs) associated with the SU frame type. In some examples, a first high-efficiency sounding NDP PPDU may comprise a high-efficiency signal A (HE-SIG-A) field. The HE-SIG-A field is set by the trigger frame that solicits the UL NDP. The HE-SIG-A field may be included in a common information field of the trigger frame that solicits the UL NDP.

At block 404, the device may identify one or more polling response frames received from the one or more anchor stations.

At block 406, the device may cause to send a trigger frame that solicits uplink null data packet (NDP) to one or more anchor stations, wherein the uplink NDP comprises an indication of a high efficiency (HE) single user (SU) frame type. The SU frame type may indicate to a passive client device a capability to decode the uplink NDP.

At block 408, the device may identify one or more uplink NDPs received from the one or more anchor stations. Timing information associated with uplink NDP is used to assist the passive client device to determine its location.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a UL NDP format for passive location device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The UL NDP format for passive location device 619 may carry out or perform any of the operations and processes (e.g., processes 400 and 500) described and shown above.

The UL NDP format for passive location device 619 may address the uplink sounding NDP format for passive location and may minimize the hardware change at the passive client side.

In one embodiment, a UL NDP format for passive location system may use the HE single user (SU) NDP format for the UL NDP in passive location, such that the passive client can decode the SU NDP without hardware change.

The UL NDP format for passive location device 619 may facilitate that the passive client may listen for the UL NDP from each of the anchor stations and the DL NDP from the master AP. In general, only the AP can decode a trigger-based PPDU. Typically, a passive client is a non-AP STA and thus cannot decode a trigger-based PPDU, but it's a mandatory requirement of 802.11 spec for the non-AP STA to decode the SU PPDU. In other words, only AP can decode the trigger based (TB) PPDU. Since the passive client is in general a non-AP STA, for example, mobile phone or laptop, the passive client cannot decode TB PPDU. For example, after receiving the trigger frame, the anchor STA will response with HE SU PPDU NDP, such that the passive client can receive and decode the SU NDP.

The UL NDP format for passive location device 619 may facilitate that the format of the trigger-based PPDU is different from the SU PPDU. For example, the HE-SIG-A1 field included in a trigger-based PPDU and an SU PPDU may contain information that would differentiate a trigger-based PPDU from an SU PPDU. Also, the length of the HE-STF field of the trigger-based PPDU and SU PPDU are different.

The UL NDP format for passive location device 619 may facilitate that a passive client would need to decode the UL NDP(s) and the DL NDP frames in order to derive timing information from these frames. The timing information may then assist the passive client device to determine its own location. However, if during location ranging measurement the master AP and the anchor stations, the anchor stations send their UL NDPs using a trigger-based PPDU, the passive client would not be able to decode these UL NDPs in order to retrieve or otherwise identify timing information included in each of the UL NDPs because the passive client may not have the capability to decode trigger-based PPDU.

The UL NDP format for passive location device 619 may facilitate that the anchor stations may respond using an HE SU PPDU format of their UL NDP sent in response to a trigger frame soliciting UL NDP received from the master AP. In essence, the passive client would hear or otherwise detect the UL NDPs from the anchor stations and may decode the UL NDPs because of the indication of the PPDU frame type being HE SU PPDU and not trigger-based.

It is understood that the above are only a subset of what the UL NDP format for passive location device 619 may be configured to perform and that other functions included throughout this disclosure may also be performed by the UL NDP format for passive location device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: cause to send a trigger frame that solicits poll response to one or more anchor stations involved in a passive ranging measurement; identify one or more polling response frames received from the one or more anchor stations; cause to send a trigger frame that solicits uplink null data packet (NDP) to one or more anchor stations, wherein the uplink NDP comprises an indication of an high efficiency (HE) single user (SU) frame type; and identify one or more uplink NDPs received from the one or more anchor stations.

Example 2 may include the device of example 1 and/or some other example herein, wherein the trigger frame that solicits uplink null data packet (NDP) triggers a first anchor station of the one or more anchor stations to send uplink NDP.

Example 3 may include the device of example 1 and/or some other example herein, wherein the one or more uplink NDPs are high-efficiency sounding NDP physical layer convergence protocol data units (PPDUs) associated with the SU frame type.

Example 4 may include the device of example 1 and/or some other example herein, wherein the SU frame type indicates to a passive client device a capability to decode the uplink NDP.

Example 5 may include the device of example 4 and/or some other example herein, wherein timing information associated with uplink NDP may be used to assist the passive client device to determine its location.

Example 6 may include the device of example 3 and/or some other example herein, wherein a first high-efficiency sounding NDP physical layer convergence protocol data unit (PPDU) comprises a high-efficiency signal A (HE-SIG-A) field.

Example 7 may include the device of example 6 and/or some other example herein, wherein the HE-SIG-A field may be set by the trigger frame that solicits the UL NDP.

Example 8 may include the device of example 6 and/or some other example herein, wherein the HE-SIG-A field may be included in a common information field of the trigger frame that solicits the UL NDP.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver to cause to send the trigger frame that solicits poll response.

Example 11 may include a non-transitory computer-readable medium storing computer-executable instructions which when executed by one or more processors result in performing operations comprising: causing to send a trigger frame that solicits poll response to one or more anchor stations involved in a passive ranging measurement; identifying one or more polling response frames received from the one or more anchor stations; causing to send a trigger frame that solicits uplink null data packet (NDP) to one or more anchor stations, wherein the uplink NDP comprises an indication of an high efficiency (HE) single user (SU) frame type; and identifying one or more uplink NDPs received from the one or more anchor stations.

Example 12 may include the non-transitory computer-readable medium of example 11 and/or some other example herein, wherein the trigger frame that solicits UL NDP triggers a first anchor station of the one or more anchor stations to send uplink NDP.

Example 13 may include the non-transitory computer-readable medium of example 11 and/or some other example herein, wherein the one or more uplink NDPs are high-efficiency sounding NDP physical layer convergence protocol data units (PPDUs) associated with the SU frame type.

Example 14 may include the non-transitory computer-readable medium of example 11 and/or some other example herein, wherein the SU frame type indicates to a passive client device a capability to decode the uplink NDP.

Example 15 may include the non-transitory computer-readable medium of example 14 and/or some other example herein, wherein timing information of uplink NDP may be used to assist the passive client device to determine its location.

Example 16 may include the non-transitory computer-readable medium of example 13 and/or some other example herein, wherein a first high-efficiency sounding NDP physical layer convergence protocol data unit (PPDU) comprises a high-efficiency signal A (HE-SIG-A) field.

Example 17 may include the non-transitory computer-readable medium of example 16 and/or some other example herein, wherein the HE-SIG-A field may be set by the trigger frame that solicits the UL NDP.

Example 18 may include the non-transitory computer-readable medium of example 16 and/or some other example herein, wherein the HE-SIG-A field may be included in a common information field of the trigger frame that solicits the UL NDP.

Example 19 may include a method comprising: causing, by one or more processors, to send a trigger frame that solicits poll response to one or more anchor stations involved in a passive ranging measurement; identifying one or more polling response frames received from the one or more anchor stations; causing to send a trigger frame that solicits uplink null data packet (NDP) to one or more anchor stations, wherein the uplink NDP comprises an indication of an high efficiency (HE) single user (SU) frame type; and identifying one or more uplink NDPs received from the one or more anchor stations.

Example 20 may include the method of example 19 and/or some other example herein, wherein the trigger frame that solicits UL NDP triggers a first anchor station of the one or more anchor stations to send uplink NDP.

Example 21 may include the method of example 19 and/or some other example herein, wherein the one or more uplink NDPs are high-efficiency sounding NDP physical layer convergence protocol data units (PPDUs) associated with the SU frame type.

Example 22 may include the method of example 19 and/or some other example herein, wherein the SU frame type indicates to a passive client device a capability to decode the uplink NDP.

Example 23 may include the method of example 22 and/or some other example herein, wherein timing information of uplink NDP may be used to assist the passive client device to determine its location.

Example 24 may include the method of example 21 and/or some other example herein, wherein a first high-efficiency sounding NDP physical layer convergence protocol data unit (PPDU) comprises a high-efficiency signal A (HE-SIG-A) field.

Example 25 may include the method of example 24 and/or some other example herein, wherein the HE-SIG-A field may be set by the trigger frame that solicits the UL NDP.

Example 26 may include the method of example 24 and/or some other example herein, wherein the HE-SIG-A field may be included in a common information field of the trigger frame that solicits the UL NDP.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 7:
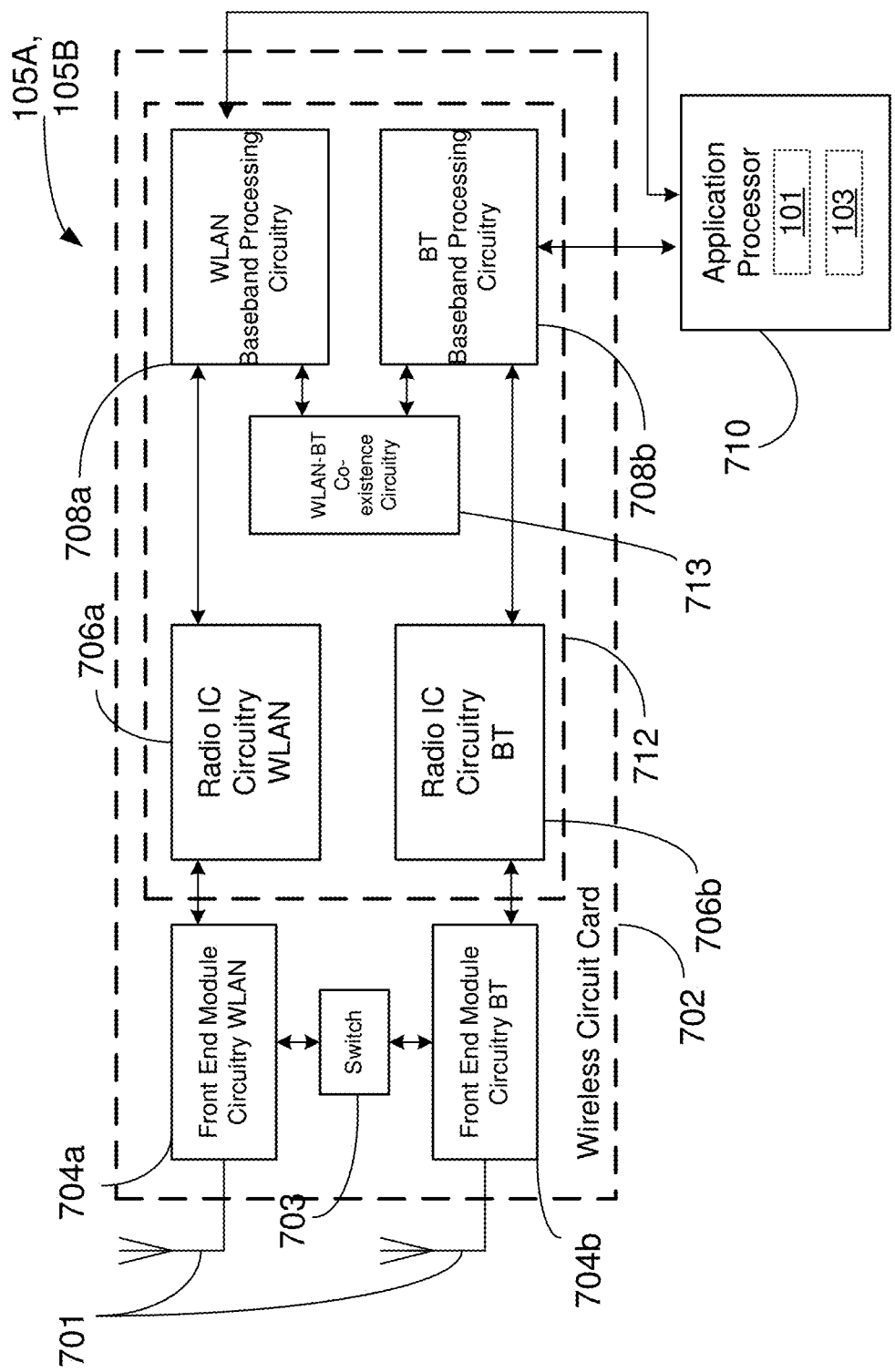
FIG. 7 is a block diagram of a radio architecture in accordance with some examples.

FIG. 7 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704*a-b*, the radio IC circuitry 706*a-b*, and baseband processing circuitry 708*a-b* may be provided on a single radio card, such as wireless radio card 702. In some other embodiments, the one or more antennas 701, the FEM circuitry 704*a-b* and the radio IC circuitry 706*a-b* may be provided on a single radio card. In some other embodiments, the radio IC circuitry 706*a-b* and the baseband processing circuitry 708*a-b* may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 708*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
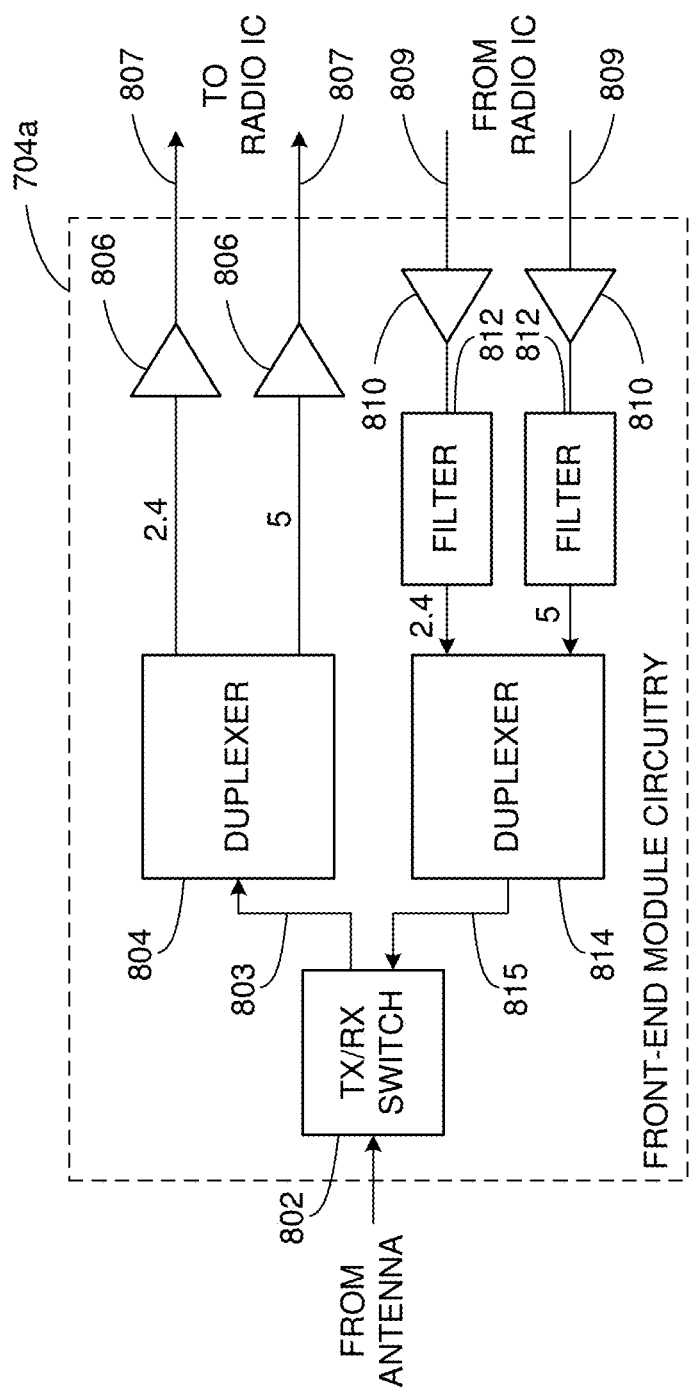
FIG. 8 illustrates an example front-end module circuitry for use in the radio architecture of FIG. 7 in accordance with some examples.

FIG. 8 illustrates WLAN FEM circuitry 704*a* in accordance with some embodiments. Although the example of FIG. 8 is described in conjunction with the WLAN FEM circuitry 704*a*, the example of FIG. 8 may be described in conjunction with the example BT FEM circuitry 704*b* (FIG. 7), although other circuitry configurations may also be suitable.

In some embodiments, the FEM circuitry 704*a* may include a TX/RX switch 802 to switch between transmit mode and receive mode operation. The FEM circuitry 704*a* may include a receive signal path and a transmit signal path. The receive signal path of the FEM circuitry 704*a* may include a low-noise amplifier (LNA) 806 to amplify received RF signals 803 and provide the amplified received RF signals 807 as an output (e.g., to the radio IC circuitry 706*a-b* (FIG. 7)). The transmit signal path of the circuitry 704*a* may include a power amplifier (PA) to amplify input RF signals 809 (e.g., provided by the radio IC circuitry 706*a-b*), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704*a* may be configured to operate in either the 2.4 GHz frequency spectrum or the 5 GHz frequency spectrum. In these embodiments, the receive signal path of the FEM circuitry 704*a* may include a receive signal path duplexer 804 to separate the signals from each spectrum as well as provide a separate LNA 806 for each spectrum as shown. In these embodiments, the transmit signal path of the FEM circuitry 704*a* may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704*a* as the one used for WLAN communications.

Figure 9:
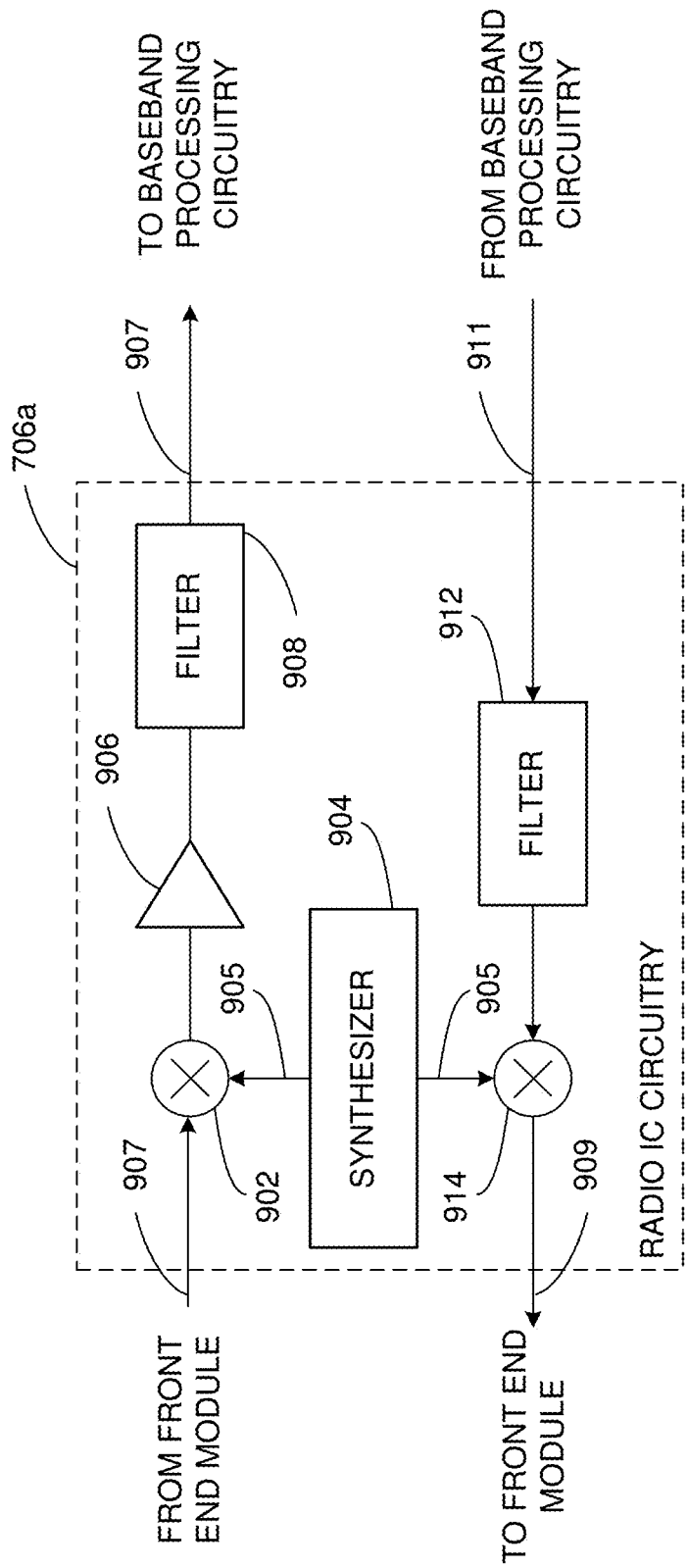
FIG. 9 illustrates an example radio IC circuitry for use in the radio architecture of FIG. 7 in accordance with some examples.

FIG. 9 illustrates radio IC circuitry 706*a* in accordance with some embodiments. The radio IC circuitry 706*a* is one example of circuitry that may be suitable for use as the WLAN or BT radio IC circuitry 706*a*/706*b* (FIG. 7), although other circuitry configurations may also be suitable. Alternatively, the example of FIG. 9 may be described in conjunction with the example BT radio IC circuitry 706*b*.

In some embodiments, the radio IC circuitry 706*a* may include a receive signal path and a transmit signal path. The receive signal path of the radio IC circuitry 706*a* may include at least mixer circuitry 902, such as, for example, down-conversion mixer circuitry, amplifier circuitry 906 and filter circuitry 908. The transmit signal path of the radio IC circuitry 706*a* may include at least filter circuitry 912 and mixer circuitry 914, such as, for example, up-conversion mixer circuitry. Radio IC circuitry 706*a* may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
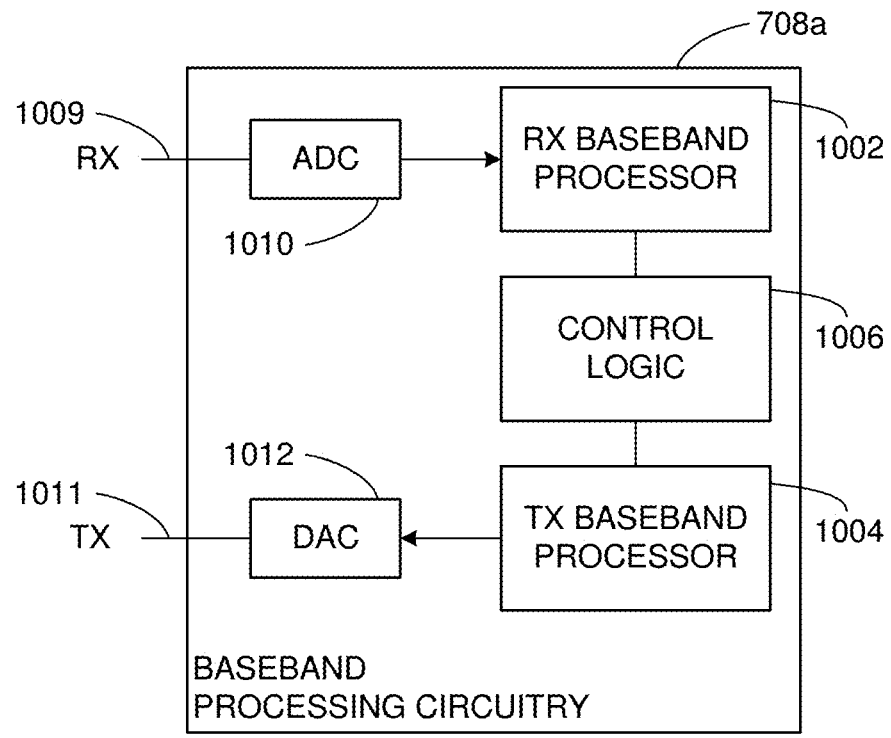
FIG. 10 illustrates an example baseband processing circuitry for use in the radio architecture of FIG. 7 in accordance with some examples.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. An apparatus of a station device, the apparatus comprising processing circuitry coupled to storage, the processing circuitry configured to:
   generate a request frame to transmit to a responder station device, the request frame indicative of a preferred time window for ranging measurements to be performed between the station device and a responder station device;
   identify a response frame received from the responder station device prior to receiving from the responder station device a measurement frame associated with performing ranging measurements, wherein the response frame indicates that the responder station device will send the measurement frame during the preferred time window;
   generate, based on the response frame, a frame to transmit to the responder station device, during the preferred time window, the frame indicating that the station device is available for the ranging measurements; and
   identify, during the preferred time window, the measurement frame received from the responder station device based on the frame indicating that the station device is available for the ranging measurements, the measurement frame associated with performing the ranging measurements, wherein the ranging measurements are based on the measurement frame received from the responder station device.

2. The apparatus of claim 1, wherein the response frame is a trigger frame.

3. The apparatus of claim 2, wherein the frame indicating that the station device is available for the ranging measurements is transmitted based on the trigger frame.

4. The apparatus of claim 1, wherein the preferred time window is periodic.

5. The apparatus of claim 1, wherein the request frame and the response frame are associated with negotiating the preferred time window.

6. The apparatus of claim 1, wherein the preferred time window also is for second ranging measurements between the station device and a second responder device.

7. The apparatus of claim 1, further comprising a transceiver configured to transmit and receive wireless signals comprising the request frame, the response frame, the frame indicating that the station device is available for the ranging measurements, and the measurement frame.

8. The apparatus of claim 7, further comprising an antenna coupled to the transceiver to cause to send the wireless signals.

9. A non-transitory computer-readable medium storing computer-executable instructions which when executed by one or more processors of a station device result in performing operations comprising:
   generating a request frame to transmit to a responder station device, the request frame indicative of a preferred time window for ranging measurements to be performed between the station device and a responder station device;
   identifying a response frame received from the responder station device prior to receiving from the responder station device a measurement frame associated with performing ranging measurements, wherein the response frame indicates that the responder station device will send the measurement frame during the preferred time window;
   generating, based on the response frame, a frame to transmit to the responder station device, during the preferred time window, the frame indicating that the station device is available for the ranging measurements; and identifying, during the preferred time window, the measurement frame received from the responder station device based on the frame indicating that the station device is available for the ranging measurements, the measurement frame associated with performing the ranging measurements, wherein the ranging measurements are based on the measurement frame received from the responder station device.

10. The non-transitory computer-readable medium of claim 9, wherein the response frame is a trigger frame.

11. The non-transitory computer-readable medium of claim 10, wherein the frame indicating that the station device is available for the ranging measurements is transmitted based on the trigger frame.

12. The non-transitory computer-readable medium of claim 9, wherein the preferred time window is periodic.

13. The non-transitory computer-readable medium of claim 9, wherein the request frame and the response frame are associated with negotiating the preferred time window.

14. The non-transitory computer-readable medium of claim 9, wherein the preferred time window also is for second ranging measurements between the station device and a second responder device.

15. A method for negotiating ranging measurement timing, the method comprising:

generating, by processing circuitry of an initiator station device, a request frame to transmit to a responder station device, the request frame indicative of a preferred time window for ranging measurements to be performed between the station device and a responder station device;

identifying, by the processing circuitry, a response frame received from the responder station device prior to receiving from the responder station device a measurement frame associated with performing ranging measurements, wherein the response frame indicates that the responder station device will send the measurement frame during the preferred time window;

generating, by the processing circuitry, based on the response frame, a frame to transmit to the responder station device, during the preferred time window, the frame indicating that the station device is available for the ranging measurements; and identifying, by the processing circuitry, during the preferred time window, the measurement frame received from the responder station device based on the frame indicating that the station device is available for the ranging measurements, the measurement frame associated with performing the ranging measurements, wherein the ranging measurements are based on the measurement frame received from the responder station device.

16. The method of claim 15, wherein the response frame is a trigger frame.

17. The method of claim 16, wherein the frame indicating that the station device is available for the ranging measurements is transmitted based on the trigger frame.

18. The method of claim 15, wherein the preferred time window is periodic.

19. The method of claim 15, wherein the request frame and the response frame are associated with negotiating the preferred time window.

20. The method of claim 15, wherein the preferred time window also is for second ranging measurements between the station device and a second responder device.

\* \* \* \* \*